United States Patent
Balannik

(10) Patent No.: US 10,412,391 B1
(45) Date of Patent: Sep. 10, 2019

(54) MINIMIZE NUMBER OF ENCODED VIDEO STREAM FRAMES FOR CONTENT RECOGNITION

(71) Applicant: AnyClip Ltd., Givatayim (IL)

(72) Inventor: Vadim Balannik, Rehovot (IL)

(73) Assignee: AnyClip Ltd., Givatayim (IL)

( * ) Notice: Subject to any disclaimer, the term of this patent is extended or adjusted under 35 U.S.C. 154(b) by 0 days.

(21) Appl. No.: 16/055,191

(22) Filed: Aug. 6, 2018

(51) Int. Cl.
  *H04N 19/139* (2014.01)
  *H04N 19/172* (2014.01)
  *H04N 19/189* (2014.01)
  *H04N 19/12* (2014.01)

(52) U.S. Cl.
  CPC .......... *H04N 19/139* (2014.11); *H04N 19/12* (2014.11); *H04N 19/172* (2014.11); *H04N 19/189* (2014.11)

(58) Field of Classification Search
  CPC .... H04N 19/139; H04N 19/189; H04N 19/12; H04N 19/172
  See application file for complete search history.

(56) References Cited

U.S. PATENT DOCUMENTS

| | | | | |
|---|---|---|---|---|
| 6,553,150 B1 * | 4/2003 | Wee | ...................... | H04N 19/132 348/473 |
| 2008/0273596 A1 * | 11/2008 | Oguz | ............... | H04N 21/23424 375/240.13 |
| 2010/0104261 A1 * | 4/2010 | Liu | ...................... | G11B 27/034 386/241 |
| 2014/0010305 A1 * | 1/2014 | Mironovich | ......... | H04N 19/597 375/240.16 |
| 2016/0314354 A1 * | 10/2016 | Teuton | .................. | G06K 9/0014 |
| 2016/0350934 A1 * | 12/2016 | Dey | ...................... | H04N 19/44 |
| 2017/0264829 A1 * | 9/2017 | Zhou | .................. | H04N 5/23296 |
| 2018/0204111 A1 * | 7/2018 | Zadeh | .................. | G06N 3/0436 |
| 2018/0310022 A1 * | 10/2018 | Edpalm | ................ | H04N 19/176 |

* cited by examiner

*Primary Examiner* — Thai Q Tran
*Assistant Examiner* — Sunghyoun Park

(57) ABSTRACT

A computer implemented method of selecting significant frames of a compressed video stream based on content difference, comprising, obtaining change information created by an encoder for an encoded video stream constructed of a plurality of encoded frames and indicative of a difference in a visual content between consecutive frames and performing the following for each of the encoded frames to select a plurality of significant frames: (1) analyze the change information to calculate a cumulative difference between the visual content of the respective encoded frame and the visual content of a most recently selected significant frame previously selected from the plurality of encoded frames and (2) select the respective encoded frame as another significant frame in case the cumulative difference exceeds a predefined threshold. Indication for each of the plurality of significant frames is output to one or more analysis systems adapted to analyze the content of the significant frames.

15 Claims, 2 Drawing Sheets

MINIMIZE NUMBER OF ENCODED VIDEO STREAM FRAMES FOR CONTENT RECOGNITION

FIELD AND BACKGROUND OF THE INVENTION

The present invention, in some embodiments thereof, relates to selecting significant frames from an encoded video stream, and, more specifically, but not exclusively, to selecting significant frames from an encoded video stream based on content difference between successive frames.

The need, use and/or application of video analysis for content recognition are rapidly increasing due to their high applicability for a plurality of applications.

Video content recognition may be applied, for example, in security applications for analyzing video stream(s) captured by cameras deployed to monitor premises. In another example, the video stream(s) captured by one or more cameras may be analyzed to identify objects, elements, motion and/or other visual attributes in the captured scene for automated and/or autonomous applications, for example, smart homes, smart cities, personal assistants and/or the like. Video content monitoring may be further applied for content monitoring, for example, child content control, brand safety and/or the like by preventing presentation of restricted content. In yet another example, video content analysis may be applied for improving advertisement performance by adjusting commercial advertisements according g to the presented content.

SUMMARY OF THE INVENTION

According to a first aspect of the present invention there is provided a computer implemented method of selecting significant frames extracted from a compressed video stream based on content difference, comprising using one or more processors for:
  Obtaining change information of an encoded video stream constructed of a plurality of encoded frames. The change information created for each of the plurality of encoded frames by an encoder of the encoded video stream is indicative of a difference between a visual content of the respective encoded frame and the visual content of a predecessor encoded frame.
  Performing the following for each of the plurality of encoded frames to select a plurality of significant frames:
    Analyze the change information to calculate a cumulative difference between the visual content of the respective encoded frame and the visual content of a most recently selected significant frame previously selected from the plurality of encoded frames.
    Select the respective encoded frame as another significant frame in case the cumulative difference exceeds a predefined threshold.
  Outputting an indication for each of the plurality of significant frames to one or more analysis systems adapted to analyze the content of the significant frames.

According to a second aspect of the present invention there is provided a system for selecting significant frames extracted from a compressed video stream based on content difference, comprising a program store storing a code and one or more processors coupled to the program store for executing the stored code. The code comprising:
  Code instructions to obtain change information of an encoded video stream constructed of a plurality of encoded frames. The change information created for each of the plurality of encoded frames by an encoder of the encoded video stream is indicative of a difference between a visual content of the respective encoded frame and the visual content of a predecessor encoded frame.
  Code instructions to perform the following for each of the plurality of encoded frames to select a plurality of significant frames:
    Analyze the change information to calculate a cumulative difference between the visual content of the respective encoded frame and the visual content of a most recently selected significant frame previously selected from the plurality of encoded frames.
    Select the respective encoded frame as another significant frame in case the cumulative difference exceeds a predefined threshold.
  Code instructions to output an indication for each of the plurality of significant frames to one or more analysis systems adapted to analyze the content of the significant frames.

The computing resources required for identifying the significant frames based on algebraic computations to the change information may be significantly reduced compared to the computing resources required for visually analyzing the encoded images to detect changes in the visual content between the encoded frames. Analyzing the significantly reduced number of encoded frames, i.e. the significant frames rather than all encoded frames may significantly reduce the computing resources required for analyzing the visual content for visual recognition applications. Moreover, rather than randomly and/or periodically, the significant frames are selected according to the visual content difference they present compared to respective most recently selected significant frames. This may ensure that any visual content objects, elements, movements and/or attributes portrayed in the encoded video stream are detected and none is missed, overlooked and/or unnoticed.

In a further implementation form of the first and/or second aspects, the change information comprising one or more of: motion vectors, transformation matrices, translation matrices, Luma scalar values and/or Chroma scalar values. Using standard change information produced by the encoder for the encoded video stream may simplify integration, adaptation and/or adoption of the significant frame selection system and method since this change information is already available for most of the popular and commonly used video encoding standards and hence no effort needs to be invested in creating such change information.

In a further implementation form of the first and/or second aspects, the change information is extracted using the FFmpeg tool. Using the standard industry tool(s) for extracting, recovering and/or retrieving the change information generated by the encoder may significantly reduce the development effort for designing, deploying and/or integrating the significant frames detection and selection in a plurality of existing video analysis systems, platforms and/or applications.

In a further implementation form of the first and/or second aspects, the cumulative difference is an aggregation of the change information of a sequence of successive encoded frames between the respective encoded frame and the most recently selected significant frame. Calculating the cumulative difference indicative of the visual content change between visual connect of the currently processed encoded frame compared to the visual content of the most recently selected significant frame may allow detection of gradual changes which accumulate over time (over frames) and select the significant frame when the gradual change is substantial, i.e. exceeds the predefined threshold.

In a further implementation form of the first and/or second aspects, a first frame of the plurality of encoded frames is selected as a first significant frame of the plurality of significant frames. The significant frame detection and selection is iterative and an initial reference frame must therefore be set as a starting point for the iterative process.

In a further implementation form of the first and/or second aspects, the respective encoded frame selected as the significant frame is decodable independently of any other encoded frames of the plurality of encoded frames. This may allow the analysis system(s) to decode the significant frames independently of other encoded frames of the encoded video stream.

In a further implementation form of the first and/or second aspects, the independently decodable frame is an I-frame in case the encoded video stream is encoded according to an encoding standard which is a member of a group consisting of: H.261, H.262, H.263, H.264 and H.265. Adapting the significant frames detection and selection to common and widely used industry video encoding standards may encourage adoption and distribution of the significant frames detection and selection system and method.

In an optional implementation form of the first and/or second aspects, a sharpness analysis is conducted to a plurality of frames adjacent to the respective frame selected as the another significant frame in case the respective encoded frame is transitional thus blurred and a least blurred frame among the plurality of adjacent frames is selected as the another significant frame. In many cases fast transition may lead to blur effects which may significantly degrade the quality of the visual content portrayed by the encoded frame. Selecting the least blurred frame as the significant farmer may therefore significantly improve the quality of the selected significant frame(s).

In an optional implementation form of the first and/or second aspects, the respective encoded frame is selected as the another significant frame in case a number of frames since the most recently selected significant frame exceeds a maximum frames threshold. Selecting at least some of the significant frames according to the maximum frames threshold may ensure maintaining a proper representation of all the encoded frames of the encoded video stream even for segments in which only a minor and/or small change is identified between the encoded frames.

In an optional implementation form of the first and/or second aspects, the maximum frames threshold is adapted according to an average number of encoded frames between each pair of independently decodable frames of the plurality of encoded frames. The average number of frames is extracted from metadata of the encoded video stream. Dynamically adjusting the maximum frames threshold according to the parameters of the encoded video stream may ensure an effective tradeoff between the number of the selected significant frames and the actual change in the visual content per video stream type. Moreover extracting the stream information from the already available metadata may simplify the identification of the video stream parameters using minor and typically insignificant computing resources.

In an optional implementation form of the first and/or second aspects, the maximum frames threshold is adapted according to an average number of encoded frames between each pair of independently decodable frames identified by clustering the number of encoded frames between each pair of independently decodable frames over at least some segments of the encoded video stream. Dynamically adjusting the maximum frames threshold according to the parameters of the encoded video stream as detected in real-time may allow adaptation of the selection per segment of the encoded video stream to ensure the effective tradeoff between the number of the selected significant frames and the actual change in the visual content.

In an optional implementation form of the first and/or second aspects, the maximum frames threshold is adapted according to a content of at least some of the plurality of encoded frames. Dynamically adjusting the maximum frames threshold according to the parameters of the encoded video stream may further ensure the effective tradeoff between the number of the selected significant frames and the actual change in the visual content per the visual content of the encoded frames.

In an optional implementation form of the first and/or second aspects, the maximum frames threshold is adapted according to a statistical analysis of a number of selected significant frames over time. Dynamically adjusting the maximum frames threshold according to the statistical analysis of the already selected significant frames, specifically with respect to the actual change between the frames may further ensure the effective tradeoff between the number of the selected significant frames and the actual change in the visual content.

In an optional implementation form of the first and/or second aspects, the plurality of encoded frames are re-encoded according to a predefined encoding standard in case the encoded video stream is not encoded according to the predefined encoding standard. Re-encoding the encoded video stream may be done to support such video stream encoded using video encoding standards not supported by the significant frames detection and selection process.

In a further implementation form of the first and/or second aspects, one or more of the analysis systems are adapted to analyze the content of the significant frames to detect one or more visual content attribute defined by one or more content recognition rules. As the range and nature of application applying visual analysis to the visual content of video frames may be huge and highly diverse most if not all of these applications may take advantage of the significant frames detection and selection to reduce the computing resources required for processing such encoded frames. Moreover, each of the application may be controlled with specific recognition rules adjusted according to the objective, nature and characteristics of the application.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF SPECIFIC EMBODIMENTS

Figure 1:
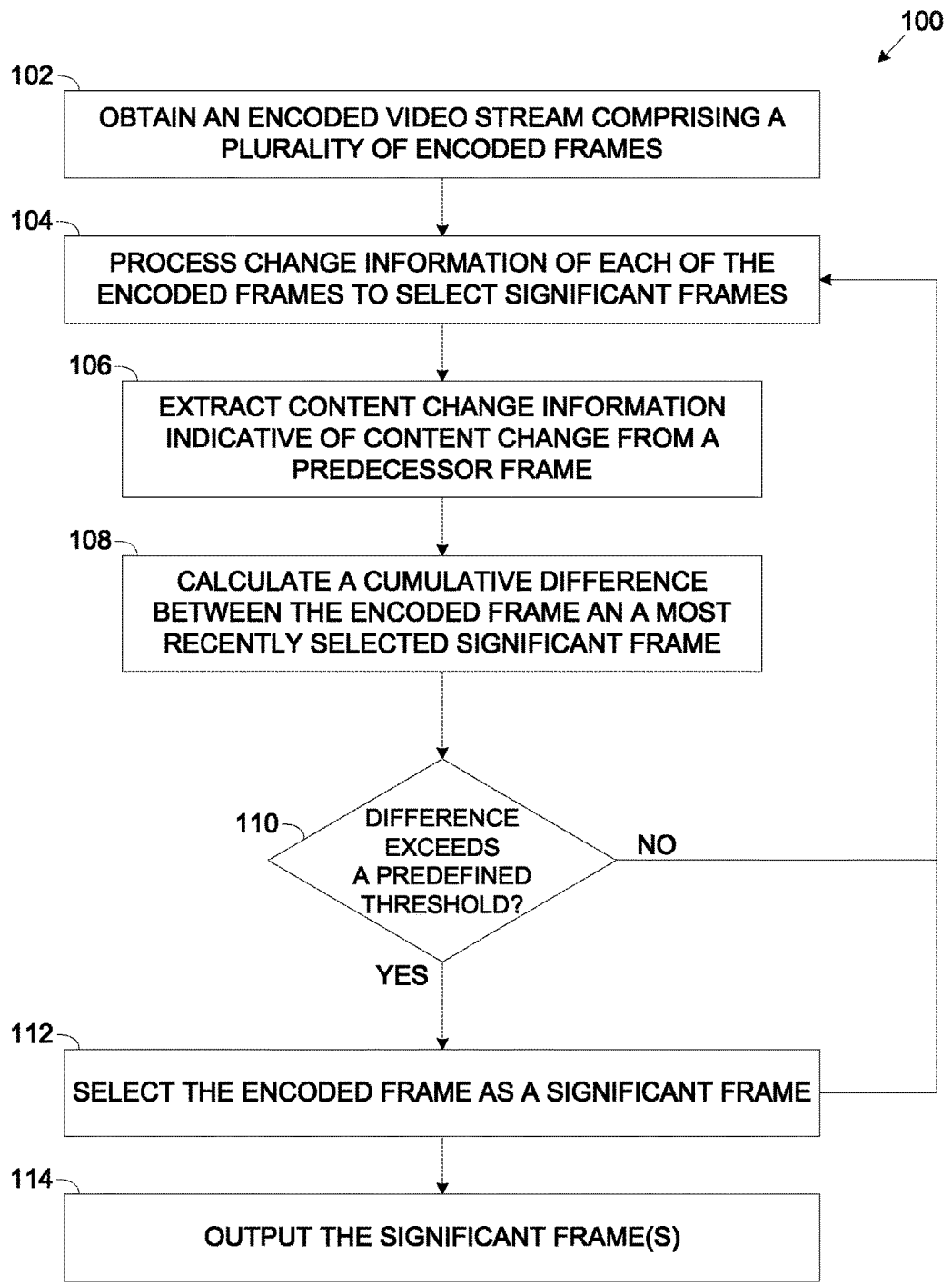
FIG. 1 is a flowchart of an exemplary process of selecting significant frames of an encoded video stream, according to some embodiments of the present invention.

The present invention, in some embodiments thereof, relates to selecting significant frames from an encoded video stream, and, more specifically, but not exclusively, to selecting significant frames from an encoded video stream based on content difference between successive frames.

Video content analysis of video streams for content recognition may be applicable for a plurality of applications ranging from security and autonomous systems to content monitoring, advertisement performance enhancement and many more. In order to reduce communication resources (e.g. bandwidth, latency), storage resources capacity and/or the like, the video streams may typically be encoded according to one or more video encoding standards (formats), for example, H.26x (e.g. H.261, H.262, H.263, H.264, H.265, etc.) and/or the like. However visually analyzing the content of the video streams may present a major challenge requiring significant computing resources, for example, processing power, time, etc. The challenge may further increase due to the ever increasing definition, resolution and/or quality of the video content, for example, 4K, 8K, etc.

According to some embodiments of the present invention, there are provided methods and systems for selecting significant frames (key frames) form an encoded video stream comprising a plurality of encoded frames arranged in temporal sequence based on content difference between successive encoded frames. In particular, the significant frames are selected without visually analyzing the frames. While the significant frames constitute a small fraction of the encoded frames they are selected such that they portray (depict) all visual objects, elements and/or attributes present in the overall encoded video stream. The significant frames comprising the limited and significantly smaller number of frames compared to the overall number of encoded frames in the encoded video stream may be further analyzed to detect one or more visual content attributes for one or more or more content recognition applications.

Video stream encoded according to most if not all video encoding standards typically include content change information generated by the encoder which indicates a content change (i.e. difference, delta) of each encoded frame compared to its predecessor encoded frame. The change information may be indicative of a difference in the visual content of the respective encoded frame compared to the predecessor frame(s). The difference may be indicative of a change in one or more visual content attributes of the visual content, for example, a change (e.g. appearance, disappearance, movement, etc.) to one or more objects and/or elements (e.g. a person, a face, a body part, an animal, a car, a building, a text, a picture, etc.) and/or part thereof, a change in a viewport of a scene, a scene change, an illumination change and/or the like. The change information may include, for example, motion vectors, transformation matrices, translation matrices, Luma data, Chroma data and/or the like. The change information may further include a scalar indication of the change of the respective encoded frame compared to its predecessor encoded frame, for example, a percentage, a value and/or the like.

Standard industry tools, for example, FFmpeg and/or the like may be used for extracting, recovering and/or retrieving the content change information from the encoded frames, for example, from the encoded frames itself, from metadata associated with the encoded frame and/or the like.

Optionally, before identifying and selecting the significant encoded frames, the encoded video stream is re-encoded according to a predefined video encoding standard (format) in case the received video stream is encoded according to a different video encoding standard.

The significant frames may be identified by processing the change information of each of the encoded frames in the encoded video stream and calculating a cumulative difference for each encoded frame. The cumulative difference is calculated using algebraic computations, for example, matrix operators, scalar calculations and/or the like applied to the change information. The cumulative difference is therefore an aggregation of the change information of multiple successive encoded frames starting from a most recently selected significant frame to the currently processed encoded frame. The cumulative difference may therefore be indicative of the visual content change between the most recently selected significant frame and the currently processed encoded frame is significant (according to a predefined change level). The first encoded frame of the encoded video stream may be selected as the first significant frame serving as a starting point and reference for selecting additional successive significant frames from the encoded video stream.

In case the cumulative difference calculated for the currently processed encoded frame exceeds a certain predefined change threshold the currently processed encoded frame is selected as another significant frame since it may present visual content which is significantly different compared to the visual content presented by the most recently selected significant frame. In case the cumulative difference calculated for the currently processed encoded frame does not exceed the predefined change threshold, the encoded frame may be discarded and the next encoded frame is processed to calculate its cumulative difference compared to the most recently selected significant frame. This process may be repeated until the cumulative difference exceeds the predefined change threshold.

Optionally, only a subset of the encoded frames of the encoded video stream is processed, specifically the subset may include frames which are decodable independently of any other encoded frame of the encoded video stream (intra frames). This means the significant frames selected from the encoded video stream are decodable independently of other encoded frames. For example, assuming the encoded video stream is encoded according to the H.264 video encoding standard, the subset may include I-Frames.

Optionally, in case an encoded frame selected as a significant frame is transitional and includes blurring effects, one or more adjacent encoded frames may be analyzed and a least blurred encoded frame among the adjacent encoded images may be selected as the respective significant frame. Such significant frames may include either decodable independently encoded frames (intra frames) and/or encoded frames which depend on other encoded frames (inter frames). For example, assuming the encoded video stream is encoded according to the H.264 video encoding standard, the inter frames may include P-Frames and/or B-Frames.

Optionally, one or more of the significant frames are selected according to a maximum frames threshold defining a maximal number of frames (distance) between two consecutive selected significant frames. This is done to avoid a scenario in which the content change in the visual content of a large number of consecutive encoded frames is relatively small such that the predefined change threshold is not exceeded for the large number of consecutive encoded frames. In order to ensure that minor content change(s) (not exceeding the predefined change threshold) are detected, using the maximum frames threshold may assure that a sufficient number of significant frames are selected to provide high coverage of the encoded video stream. This means that in case the maximum frames threshold is met for the currently processed encoded frame, the encoded frame may be selected as a significant frame event even if the cumulative difference calculated for the currently processed encoded frame does not exceed the predefined change threshold.

The maximum frames threshold may be defined according to one or more parameters of the encoded video stream. Moreover, the maximum frames threshold may be dynamically adjusted in real-time. For example, the maximum frames threshold may be adjusted according to an average number of frames between each pair of consecutive independently decodable frames, for example, P-Frames and B—in case the encoded video stream is encoded according to the H.264 video encoding standard. In another example, the average number of frames between each pair of consecutive independently decodable frames (intra frames) may be identified by applying one or more algorithms for clustering the encoded frames according to their type over one or more segments of the encoded video stream. In another example, the average number of frames between each pair of consecutive independently decodable frames may be defined according to the content, specifically the visual content of the encoded frames and/or according to a content category (type) of the encoded video stream. As such the average number of frames may be defined to be relatively low for highly changing visual content and/or to a frequently changing viewport, for example, a sports event, an action movie and/or the like. In contrast, the average number of frames may be defined to be relatively high for substantially constant and/or static visual content, for example, news broadcast, a chess match and/or the like.

Optionally, one or more of the significant frames are selected according to a statistical analysis of the number of significant frames previously selected. For example, assuming that in one or more previous segments of the encoded video stream a certain averaged number of significant frames was selected, the same number of significant frames may be selected in one or more current and/or future segments of the encoded video stream.

The process of selecting the significant frames may be repeated throughout the entire encoded video stream to select a plurality of significant frames which may be further analyzed for one or more visual content recognition applications.

Selecting the significant frames for the visual content analysis may present significant advantages over currently existing methods for video content analysis. Some of the existing systems may analyze each frame of the encoded video stream. Analyzing each encoded frame, in particular visually analyzing each frame may be computing intensive requiring major computing resources, for example, processing power, time, storage capacity, etc. The required computing resources may dramatically increase for analyzing video streams supporting high definition, high resolution and/or high quality, for example, 4K, 8K, etc. Typically there may be minor and/or little change between the visual content of consecutive frames. The limited and significantly small number of significant frames may therefore be fully representative of all the encoded frames. Analyzing the significantly reduced number of encoded frames, i.e. the significant frames rather than all encoded frames may significantly reduce the computing resources required for analyzing the visual content for visual recognition applications.

In attempt to reduce the computing resources required for analyzing the visual content of the encoded frames, some existing systems may analyze only a subset of encoded frames selected at random or periodically from the encoded video stream. Since the subset of analyzed encoded frames is selected at random or periodically, visual content objects, elements, movements and/or attributes may be missed. In particular, visual content objects, elements, movements and/or attributes which appear briefly (flash content) in the encoded video stream may be missed, overlooked and/or unnoticed.

For example, when selecting the encoded frames at random or periodically, a flashing image and/or text inserted in several encoded frames (e.g. 8 frames) of the encoded video stream may not be detected. In another example, an object (e.g. person, car, etc.) which may appear in a significantly short sequence of encoded frames of the encoded video stream, for example, 10 frames may not be detected. Selecting the significant frames on the other hand may prevent missing these visual content objects, elements, motion and/ or attributes. Since each of the significant frames is selected according to the content difference it presents compared to its respective most recently selected significant frame, every change to the visual content in any of the encoded frames of the encoded video stream may trigger a selection of another significant frame. As such any visual content objects, elements, movements and/or attributes portrayed in the encoded video stream may be detected and none is missed, overlooked and/or unnoticed.

Moreover, the computing resources required for identifying the significant frames which involves algebraic computations to the change information may be significantly reduced compared to the existing systems which may apply computing intensive visual analysis for detecting changes in the visual content between the encoded frames. Furthermore, using the standard industry tool(s) for extracting, recovering and/or retrieving the change information generated by the encoder for the encoded frames may significantly reduce the development effort for designing, deploying and/or integrating the significant frames detection and selection in a plurality of existing video analysis systems, platforms and/or applications. Using the standard industry tool(s) may also simplify and hence accelerate and/or encourage adoption of the significant frames detection and selection in such systems, platforms and/or applications.

Furthermore, by re-encoding the received encoded video stream according to the predefined video encoding standard, the video encoding formats significant frames selection method and system may be easily adapted, integrated and/or adopted by a plurality of application employing different video encoding standards and/or formats.

In addition, by replacing blurred encoded frame(s) selected as significant frame(s) with respective adjacent lass blurred frame(s), the quality of the significant frame(s) may be significantly improved.

Also, selecting at least some of the significant frames according to the maximum frames threshold may ensure maintaining a proper representation of all the encoded frames of the encoded video stream even for segments of the encoded video stream in which only a minor and/or small change is identified between the frames of the segment. Moreover, dynamically adjusting the maximum frames threshold according to the parameters of the encoded video stream, according to the visual content of the video stream and/or according to statistical analysis of the significant frames selection process may ensure an effective tradeoff between the number of the selected significant frames and the actual change in the visual content.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a flowchart of an exemplary process of selecting significant frames of an encoded video stream, according to some embodiments of the present invention. An exemplary process 100 may be executed for selecting significant (key) frames from an encoded video stream based on content difference between successive frames.

Figure 2:
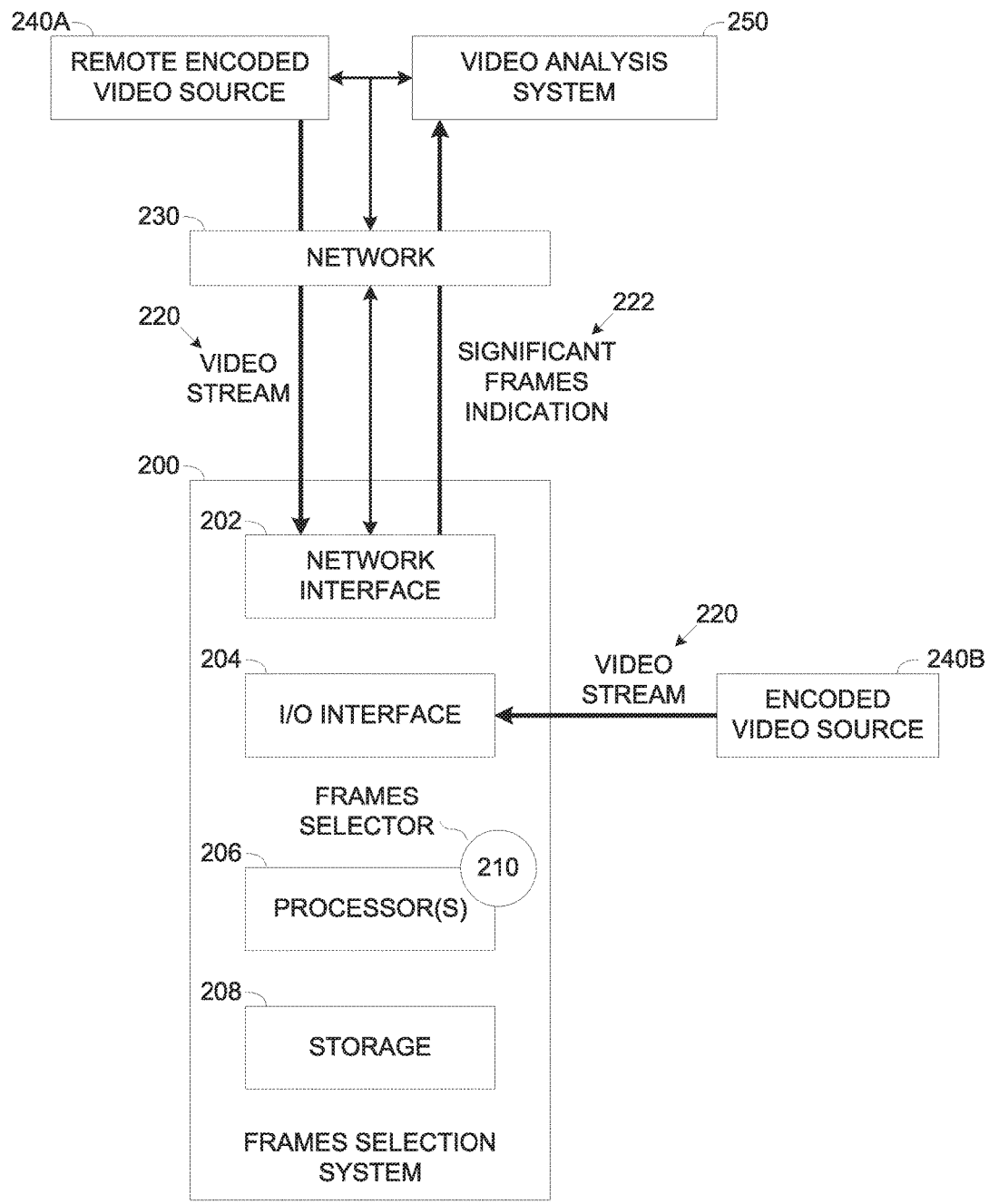
FIG. 2 is a schematic illustration of an exemplary system for selecting significant frames of an encoded video stream, according to some embodiments of the present invention.

Reference is also made to FIG. 2, which is a schematic illustration of an exemplary process for selecting significant frames of an encoded video stream, according to some embodiments of the present invention. An exemplary frames selection system 200, for example, a server, a computing node, a cluster of computing nodes and/or the like may include a network interface 202 an Input/Output (I/O) interface 204, a processor(s) 206 for executing a process such as the process 100 and a storage 208.

The frames selection system 200 may receive an encoded video stream 220 from one or more encoded video sources 240 and execute the process 100 to select significant frames from the encoded video stream 220 and provide an indication 222 of the selected significant frames to one or more video analysis systems 250 for further analysis of the content of the significant frames.

The network interface 202 may include one or more wired and/or wireless interfaces for connecting to a network 230 comprising one or more wired and/or wireless networks, for example, a Local Area Network (LAN), a Wide Area Network (WAN), a Metropolitan Area Network (MAN), a cellular network, the internet and/or the like to facilitate communication with one or more remote network resources.

The frames selection system 200 may communicate via the network 230 with the video analysis system(s) 250 adapted to analyze the encoded video stream 220, in particular the content of one or more frames of the encoded video stream. The video analysis system(s) 250 may be adapted to analyze the content of the encoded video stream 220 for one or more objectives and/or purposes, for example, security, video content monitoring, video streams comparison, advertising enhancement, brand safety and/or the like.

The frames selection system 200 may communicate with the video analysis system(s) 250 to provide the indication 222 of the significant frames identified and selected in the encoded video stream 220. The video analysis system(s) 250 may have access to the encoded video stream 220 and may use the significant frames indication 222 to extract the selected significant frames from the encoded video stream 220. Additionally and/or alternatively, the frames selection system 200 may further provide the actually selected significant frames to the video analysis system(s) 250 as part of the significant frames indication 222.

The frames selection system 200 may further communicate over the network 230 with one or more remote encoded video sources 240A, for example, a network imaging device (e.g. camera, infrared camera, night vision device, thermal camera, etc.), a video collection system, a video content provider and/or the like providing online and/or off-line encoded video stream(s) 220 encoded according to one or more video encoding standards, for example, H.26x (e.g. H.261, H.262, H.263, H.264, H.265, etc.) and/or the like.

The I/O interface 204 may include one or more wired and/or wireless interfaces, for example, a Universal Serial Bus (USB), a serial interface, a Radio Frequency (RF) interface, a Wireless LAN (WLAN, e.g. Wi-Fi, etc.) interface and/or the like for connecting to one or more local encoded video sources 240B, for example, a video encoder, a camera, an infrared camera, a night vision device, a thermal camera and/or the like adapted to transmit an encoded video stream such as the encoded video stream(s) 220.

The processor(s) 204, homogenous or heterogeneous, may include one or more processing nodes arranged for parallel processing, as clusters and/or as one or more multi core processor(s).

The storage 208 may include one or more non-transitory persistent storage devices, for example, a hard drive, a Flash array and/or the like. The storage 208 may also include one or more volatile devices, for example, a Random Access Memory (RAM) component and/or the like. The program store 208 may further comprise one or more network storage devices, for example, a storage server, a Network Accessible Storage (NAS), a network drive and/or the like accessible through the network interface 202 and/or through the I/O interface 204.

The processor(s) 206 may execute one or more software modules such as, for example, a process, a script, an application, an agent, a utility, a tool and/or the like each comprising a plurality of program instructions stored in a non-transitory medium (program store) such as the storage 208 and executed by one or more processors such as the processor(s) 206. For example, the processor(s) 206 may execute a frames selector 210 for executing the process 100 to identify and select the significant frame sin the encoded video stream 220. The frames selector 210 may further utilize one or more hardware elements may include, for example, a circuit, a component, an Integrated Circuit (IC), an Application Specific Integrated Circuit (ASIC), a Field Programmable Gate Array (FPGA), a Digital Signals Processor (DSP), a Graphic Processing Units (GPU) and/or the like for executing the process 100.

Optionally, the frames selection system 200 and/or the frames selector 210 executed by the frames selection system 200 are implemented as one or more cloud computing services, for example, an Infrastructure as a Service (IaaS), a Platform as a Service (PaaS), a Software as a Service (SaaS) and/or the like such as, for example, Amazon Web Service (AWS), Google Cloud, Microsoft Azure and/or the like.

Optionally, the frames selection system 200 is integrated with one or more of the video analysis systems 250 such that the frames selector 210 and/or one or more other software modules executed by the frames selection system 200 perform the content analysis of the significant frames selected by the frames selector 210.

Optionally, the frames selection system 200 is integrated with one or more of the encoded video sources 240, either the networked encoded video source(s) 240A and/or the local encoded video source(s) 240B. For example, the frames selection system 200 may be integrated in a camera type of encoded video source 240 and/or the like such that the frames selector 210 optionally supported by one or more hardware components is executed by the camera.

As shown at 102, the process 100 starts with the frames selector 210 obtaining the encoded video stream 220 comprising a plurality of encoded frames encoded according to one or more video encoding standards (formats), for example, H.26x (e.g. H.261, H.262, H.263, H.264, H.265, etc.) and/or the like.

Video streams such as the encoded video stream 220 which are encoded according to most if not all video encoding standards, for example, H.26x (e.g. H.261, H.262, H.263, H.264, H.265, etc.) and/or the like include content change information generated by the encoder if the encoded video stream 220.

The change information represents visual content change in each frame compared to its predecessor frame. The visual content presented by the encoded frames may include one or more visual objects, elements and/or part thereof, for example, a human, a face, a body part, an animal, an item (e.g. a car, a building, a street, etc.), a text, a picture, a slogan and/or the like. The change information indicating change(s) in the visual content of the encoded frames may therefore describe a change in one or more attributes of one or more of the objects and/or elements present in the encoded frames, for example, appearance of an object/element, disappearance of an object/element, movement of an object/element, gesture of an object, a color change, an illumination change and/or the like. The change information may include, for example, motion vectors, transformation matrices, translation matrices, Luma data, Chroma data and/or the like. The change information may further include a scalar indication of the change of the respective encoded frame compared to its predecessor encoded frame, for example, a percentage, a value and/or the like.

The encoded video stream 220 and/or part thereof may be a live streaming video stream captured in real-time and encoded by the encoded video source 240. For example, the encoded video stream 220 may be a live stream captured by a camera deployed to monitor a certain geographical area, for example, a street corner, a room, a premises and/or the like and encoded in real-time by a video encoder. The encoded video stream 220 and/or part thereof may further include video stream(s) which is non real-time, for example, a video stream captured at a previous (past) time, produced video content (e.g. entertainment, educational, marketing, etc.). For example, the encoded video stream 220 may include produced video content, for example, a movie, a recorded music concert, a commercial advertisement and/or the like obtained from a content provider.

The frames selector 210 may receive the encoded video stream 220, for example, from the remote encoded video source 240A via the network 230. In another example, the frames selector 210 may receive the encoded video stream 220 from the local encoded video source 240B via the I/O interface 204. Optionally, the encoded video stream 220 received from the encoded video source 240 is locally stored in the frames selection system 200, for example, in the storage 208. The frames selector 210 may retrieve the locally stored encoded video stream 220 and/or part thereof from the storage 208.

Optionally, the frames selection system 200 executing the frames selector 210 and/or one or more other software modules re-encodes the encoded video stream 220 according to a predefined video encoding standard (format) in case the encoded video stream 220 is encoded according to a different video encoding standard. Typically, the re-encoding may apply to the visual content of the encoded video stream 220 while the audio part of the encoded video stream 220 may be left encoded in its original encoding standard (format). For example, assuming the frames selector 210 is adapted to process encoded video stream(s) 220 encoded according to the predefined video encoding standard, for example, the H.264 (MPEG-4 AVC) video encoding standard. Further assuming the received encoded video stream 220 is encoded according to a different encoding standard, for example, H.262 (MPEG-2), H.263, MPEG-4 part 2 and/or the like. In such case the frames selection system 200 and/or the frames selector 210 may re-encode the received encoded video stream 220 according to the H.264 video encoding standard.

As shown at 104, the frames selector 210 may process the change information of each of the encoded frames of the encoded video stream 220 to identify and select a plurality of significant frames from the encoded video stream. Each significant frame is a selected encoded frame which portrays visual content that is significantly different from the visual content of previously selected significant frames. The difference between each significant frames and its predecessor selected significant frame(s) therefore implies a change in one or more of the attributes of one or more of the objects and/or elements present in the encoded frames. As such the collection of all the significant frames may capture all visual elements, objects, attributes and/or the like present (depicted) in all of the encoded frames of the encoded video stream 220.

The frames selector 210 may optionally process the change information of a subset of encoded frames extracted from the encoded video stream 220. For example, the frames selector 210 may process the change information of encoded frames which are decodable independently of any other encoded frame of the encoded video stream 220, i.e. intra frames, for example, I-Frames. This means the significant frames selected from the encoded video stream 220 are decodable independently of other encoded frames. This may allow the analysis system 250 to decode the selected significant frames without decoding additional non-selected encoded frames thus significantly reducing computing resources, for example, processing power, processing time, storage resources and/or the like. In another example, the frames selector 210 may process the change information of inter frames, for example, B-Frames which are decodable dependent on both preceding and succeeding frames, for example, I-Frames and P-Frames. Processing the B-Frames to identify the difference in the visual content in the frame may present improved results since the change information relates to both backward and forward frames.

For example, assuming the encoded video stream 220 (optionally after re-encoded) is encoded according to the H.264 video encoding standard, the encoded video stream 220 includes Groups of Pictures (GOPs) each comprising I-Frame(s), P-Frames and B-Frames. The I-Frames are lossless frames depicting all visual data and may be decoded independently of other frames of the encoded video stream 220. The P-Frames and B-Frames on the other hand may be partial (delta) and/or dependent on other frames including the I-Frames and therefore decoding the P-Frames and/or the B-Frames requires decoding the respective I-Frames. Since the I-Frames are the reference frames they contain all visual content present in the encoded frames of the encoded video stream 220 and the I-Frames are therefore sufficient for identifying all content attribute(s) and change(s) to these content attribute(s) as depicted in the encoded video stream 220. In such case, the subset of encoded frames selected by the frames selector 210 for content change processing may include only I-Frames while P-Frames and B-Frames are discarded.

The frames selector 210 may typically select the first encoded frame, specifically the first independently decodable frame (e.g. I-Frame) of the encoded video stream 220 as the first significant frame. The first significant frame may serve as a starting point and reference for selecting additional successive significant frames from the encoded video stream 220.

As shown at 106, the frames selector 210 extracts content change information, specifically visual content change information associated with the respective (currently processed) encoded frame. The content change information may be encoded according to the video encoding standard used for encoding the encoded video stream 220. For example, the content change information may be encoded in the encoded frame itself. In another example, the content change information may be encoded in metadata associated with the encoded frame. For example, assuming the encoded video stream 220 (optionally after re-encoded) is encoded according to the H.264 video encoding standard the content change information may be encoded in the form of motion vectors, block definition and/or the like.

The frames selector 210 may extract, retrieve and/or obtain the content change information of the encoded frame using one or more video encoding tools and/or video processing tools as known in the art, for example, FFmpeg and/or the like.

As shown at 108, based on analysis of the content change information extracted for the respective (currently processed) encoded frame, the frames selector 210 calculates a cumulative difference which is indicative of the visual change between the visual content of the respective encoded frame and the visual content of a most recently selected significant frame. The calculation may include algebraic operations applied to the change information, for example, matrix operators, scalar calculation and/or the like. As such the cumulative difference is an aggregation, for example, a sum and/or the like of the visual content change(s) accumulated over multiple encoded frames which are temporally located between the most recently selected significant frame and the respective encoded frame. Since the frames selector 210 may typically process the subset of independently decodable frames, the cumulative difference is calculated over multiple independently decodable frames of the encoded video stream 220.

As shown at 110, which is a conditional step, the frames selector 210 compares the calculated cumulative difference to a predefined change threshold. In case the cumulative difference exceeds the predefined change threshold, the process 100 branches to 112 and in case the cumulative difference does not exceed the predefined change threshold, the process 100 branches back to 104 where the frames selector 210 starts processing the following (next) encoded frame of the encoded video stream 220. The change threshold may be fixed, for example, 40%, i.e. in case the cumulative difference is more than 40% of the visual content compared to the most recently selected significant frame the process branches to 112.

Optionally, the change threshold is dynamically adapted and/or adjusted based on a statistical analysis of the selected significant frames conducted over one or more segments of the encoded video stream 220. It may be deduced from the statistical analysis what is the statistical difference in the visual content between consecutive encoded frames and the change threshold may be adjusted accordingly. The difference in the visual content between consecutive encoded frames may primarily depend on the type of the video content. For example, based on the statistical analysis of the visual content difference (change), the change threshold may be adjusted to 25% for high motion video content such as, for example, sports content, action movies and/or the like while the change threshold may be adjusted to 60% for news broadcasts.

As shown at 112, in case the cumulative difference exceeds the predefined change threshold, the frames selector 210 selects the respective encoded frame as another significant frame. The process 100 may then branch back to 104 where the frames selector 210 starts processing the change information of the following (next) encoded frame of the encoded video stream 220.

As described for step 108, the cumulative difference may be indicative of the visual content change accumulated over multiple encoded frames between the most recently selected significant frame and the respective encoded frame. For example, assuming a frame n is the most recently selected significant frame. When processing the change information of the encoded frame n+1, the frames selector 210 calculates the difference between the encoded frame n and the encoded frame n+1. In case the difference exceeds the predefined change threshold, the frames selector 210 selects the encoded frame n+1 as another significant frame. However, in case the difference does not exceed the predefined change threshold, the frames selector 210 processes the change information of the encoded frame n+2 and calculates the cumulative difference between the encoded frame n (most recently selected significant frame) and the encoded frame n+2. In case the cumulative difference exceeds the predefined change threshold, the frames selector 210 selects the encoded frame n+2 as another significant frame. In case the cumulative difference still does not exceed the predefined change threshold, the frames selector 210 processes the change information of the encoded frame n+3 and calculates the cumulative difference between the encoded frame n (most recently selected significant frame) and the encoded frame n+3. This may repeat until the cumulative difference exceeds the predefined change threshold.

Optionally, in case the respective encoded frame selected as a significant frame is transitional and includes blurring effects, the frames selector 210 analyzes sharpness of multiple encoded frames adjacent to the respective encoded frame, specifically independently decodable frames (e.g. I-Frames) and selects a least blurred encoded frame. The least blurred encoded frame selected as the significant frame may be an inter frame encoded frame which is dependent on other frames for decoding, for example, a P-Frame and/or a B-Frame. It is possible that one or more objects and/or part(s) thereof which are portrayed in the respective encoded frame are in motion and the respective encoded frame may therefore be at least partially blurred. Moreover, the cumulative difference calculated for the respective encoded frame may exceed the predefined change threshold due to the blurring effects. The frames selector 210 may therefore analyze the sharpness of several adjacent encoded frames, for example, 2 frames to each side, i.e. 2 frames temporally preceding the respective encoded frames in the encoded video stream 220 and 2 frames temporally succeeding the respective encoded frames in the encoded video stream 220. Based on the sharpness analysis, the frames selector 210 may select the least blurred encoded frame of the adjacent encoded frames as the significant frame to prevent selection of the respective encoded frame which is blurred as the significant frame.

Optionally the frames selector 210 selects one or more of the significant frames according to a maximum frames threshold defining a maximal number of frames (distance) between two consecutive significant frames. In some scenarios the content change in the content of a large number of consecutive encoded frames may be relatively small such that the predefined change threshold is not exceeded for the large number of consecutive encoded frames. In order to ensure that minor content changes may be detected the frames selector 210 needs to select a sufficient number of significant frames.

The frames selector 210 may therefore be adapted to select one or more significant frames according to the maximum frames threshold even if the cumulative difference does not exceed the predefined change threshold. For example, the maximum frames threshold may be set to 50 such that in case the cumulative difference calculated for 50 consecutive encoded frames, specifically independently decodable frames (e.g. I-Frames) does not exceed the predefined change threshold, the frames selector 210 may select the $50^{th}$ encoded frame since the most recently selected significant frame as another significant frame.

The maximum frames threshold defining the maximal number of frames (distance) between two consecutive significant frames may be defined according to one or more parameters of the encoded video stream 220. Moreover, the maximum frames threshold may be dynamically adapted in real-time according to one or more of the parameters of the encoded video stream 220. Dynamically adjusting the maximum frames threshold may be done, for example, based on statistical analysis conducted over one or more segments of the encoded video stream 220. The statistical analysis may be applied to analyze the changes in the visual content estimated by the frames selector 210, i.e. in the significant frames selected from the encoded video stream 220 compared to the frames in which the visual content actually changed.

Therefore in case, based on the statistical analysis, the frames selector 210 determines the significant frames accurately capture the changes in the visual content, the maximum frames threshold may be left as is. However in case the frames selector 210 determines that redundant significant frames were selected, meaning that fewer significant frames may present the same visual content changes, the frames selector 210 may increase the maximum frames threshold. Similarly, in case the frames selector 210 determines that the significant frames selected from the encoded video stream 220 fail to capture all changes in the visual content, the frames selector 210 may decrease the maximum frames threshold. The statistical analysis may include, for example, construction of a histogram in which the number of frames from the most recently selected significant frame defines the X axis and the frames in which the change actually occurred define the Y axis. The frames selector 210 may analyze the histogram to determine whether the maximum frames threshold needs to be adjusted.

For example, the maximum frames threshold may be adapted according to an average number of frames between each pair of consecutive independently decodable frames, for example, P-Frames and B-Frames for encoded video stream 220 encoded according to the H.264 video encoding standard. The average number of the frames between each pair of consecutive independently decodable frames may be extracted, for example, from the metadata of the encoded frames and/or from the metadata of the encoded video stream 220.

In another example, the average number of frames between each pair of consecutive independently decodable frames may be identified by applying one or more algorithms for clustering the encoded frames according to their type over one or more segments of the encoded video stream 220. The algorithm(s) may further include one or more machine learning models and/or algorithms, for example, a neural network, a Support Vector Machine (SVM), a decision tree, a K-Nearest neighbors algorithm and/or any other learning algorithm trained to identify the encoded frames.

In another example, the average number of frames between each pair of consecutive independently decodable frames may be defined according to the content, specifically the visual content of the encoded frames and/or according to a content category (type) of the encoded video stream 220. As such the average number of frames may be defined to be relatively low, for example, 37 frames for highly changing visual content and/or to a frequently changing viewport, for example, a sports event, an action movie and/or the like. In contrast, the average number of frames may be defined to be relatively high, for example, 75 frames for substantially constant and static visual content, for example, a news broadcast, a chess match and/or the like.

Optionally, the frames selector 210 selects one or more of the significant frames according to a statistical analysis of the number of significant frames previously selected. For example, assuming the frames selector 210 identifies that in one or more previous segments of the encoded video stream 220 a certain averaged number of significant frames was selected. The frames selector 210 may be adjusted to select significant frames according to the certain averaged number of significant frames in one or more current and/or future segments of the encoded video stream 220.

Steps 104 through 112 of the process 100 may be repeated until detecting an end of the encoded video stream 220 and/or until receiving a stop (halt) instruction to stop processing the encoded video stream 220.

As shown at 114, the frames selector 210 outputs an indication of the selected significant frame to one or more of the analysis systems 250 which may further analyze the significant frame(s), specifically the content of the significant frame(s) for one or more objectives and/or purposes.

The indication the frames selector 210 outputs to the analysis system(s) 250 may include for example, an identifier of the selected significant frame. This may be applicable in case the analysis system(s) 250 have access to the encoded video stream 220 and may retrieve the indicated significant frame from the video stream 220.

Optionally, the frames selector 210 outputs the selected significant frame itself to one or more of the analysis systems 250 such that the selected significant frame is available to the analysis system(s) 250.

The frames selector 210 may output the indication of the selected significant frame and/or the selected significant frame itself in real-time, i.e. during the process 100 and following selection of the selected significant frame. Optionally, the frames selector 210 stores the indication of the selected significant frame and/or the selected significant frame, for example, in the storage 208. The frames selector 210 may provide (output) the indication(s) of the selected significant frames and/or the selected significant frames themselves to the analysis system(s) 250 at a later time.

The analysis system(s) 250 may further analyze the content, specifically the visual content of the significant frames selected and provided by the frames selector 210 to identify one or more visual content attributes of the visual content defined by one or more content recognition rules. The number of the significant frames may naturally be significantly limited and small compared to the number of all encoded frames in the encoded video stream 220. The computing resources required by the analysis system(s) 250 for analyzing the visual content of the only significant frames may therefore be significantly reduced.

The analysis system(s) 250 may be applied for a plurality of applications, for example, security, video content monitoring, video streams comparison, advertising enhancement, brand safety and/or the like. The content recognition rules may therefore be adapted and defined according to the application for which the visual content analysis is used. For example, in the security application, a certain content recognition rule may define analyzing one or more of the significant frames to detect an object(s), a person(s) and/or the like entering a certain area, crossing a certain perimeter line and/or the like. In another example, in the brand safety application, a certain content recognition rule may define analyzing the video content and restrict presentation of certain embedded content embedded in the encoded video stream in case the video content is inappropriate for the embedded content. In another example, in the advertising enhancement application, a certain content recognition rule may define analyzing the video content and selecting one or more online advertisements (ADs) according to the content of the encoded video stream.

It is expected that during the life of a patent maturing from this application many relevant systems, methods and computer programs will be developed and the scope of the terms video encoding standards and machine learning models and/or algorithms are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of selecting significant frames extracted from a compressed video stream based on content difference, comprising:
    using at least one processor for:
        obtaining change information of an encoded video stream constructed of a plurality of encoded frames, the change information created for each of the plurality of encoded frames by an encoder of the encoded video stream is indicative of a difference between a visual content of a respective encoded frame and visual content of a predecessor encoded frame;
        performing following actions for each of the plurality of encoded frames to select a plurality of significant frames:
            analyze the change information to calculate a cumulative difference between visual content of the respective encoded frame and visual content of a most recently selected significant frame previously selected from the plurality of encoded frames, and
            select the respective encoded frame as another significant frame in case the cumulative difference exceeds a predefined threshold; and
        outputting an indication for each of the plurality of significant frames to at least one analysis system adapted to analyze content of the significant frames;
    wherein the respective encoded frame is selected as the another significant frame in case a number of frames since the most recently selected significant frame exceeds a maximum frames threshold.

2. The computer implemented method of claim 1, wherein the change information comprising at least one of: a motion vector, a transformation matrix, a translation matrix, a Luma scalar value and a Chroma scalar value.

3. The computer implemented method of claim 1, wherein the change information is extracted using an FFmpeg tool.

4. The computer implemented method of claim 1, wherein the cumulative difference is an aggregation of change information of a sequence of successive encoded frames between the respective encoded frame and the most recently selected significant frame.

5. The computer implemented method of claim 1, wherein a first frame of the plurality of encoded frames is selected as a first significant frame of the plurality of significant frames.

6. The computer implemented method of claim 1, wherein the respective encoded frame selected as the significant frame is decodable independently of any other encoded frames of the plurality of encoded frames.

7. The computer implemented method of claim 6, wherein the plurality of encoded frames comprises a plurality of independently decodable frames; wherein each of the plurality of independently decodable frames is an I-frame in case the encoded video stream is encoded according to an encoding standard which is a member of a group consisting of: H.261, H.262, H.263, H.264 and H.265.

8. The computer implemented method of claim 1, further comprising analyzing a sharpness of a plurality of frames adjacent to the respective encoded frame and selecting a least blurred frame among a plurality of adjacent frames among the plurality of encoded frames as the another significant frame.

9. The computer implemented method of claim 1, further comprising adapting the maximum frames threshold according to an average number of encoded frames between each pair of independently decodable frames of the plurality of encoded frames, the average number of frames is extracted from metadata of the encoded video stream.

10. The computer implemented method of claim 1, further comprising adapting the maximum frames threshold according to an average number of encoded frames between each pair of independently decodable frames identified by clustering a number of encoded frames between each pair of independently decodable frames over at least some segments of the encoded video stream.

11. The computer implemented method of claim 1, further comprising adapting the maximum frames threshold according to a visual content of at least some of the plurality of encoded frames.

12. The computer implemented method of claim 1, further comprising adapting the maximum frames threshold according to a statistical analysis of a number of selected significant frames over time.

13. The computer implemented method of claim 1, further comprising re-encoding the plurality of encoded frames according to a predefined encoding standard.

14. The computer implemented method of claim 1, wherein the at least one analysis system is adapted to analyze content of the significant frames to detect at least one visual content attribute defined by at least one content recognition rule.

15. A system for selecting significant frames extracted from a compressed video stream based on content difference, comprising:
  a program store storing a code; and
  at least one processor coupled to the program store for executing the stored code, the code comprising:
    code instructions to obtain change information of an encoded video stream constructed of a plurality of encoded frames, the change information created for each of the plurality of encoded frames by an encoder of the encoded video stream is indicative of a difference between a visual content of a respective encoded frame and visual content of a predecessor encoded frame;
    code instructions to perform following actions for each of the plurality of encoded frames to select a plurality of significant frames:
      analyze the change information to calculate a cumulative difference between visual content of the respective encoded frame and the visual content of a most recently selected significant frame previously selected from the plurality of encoded frames, and
      select the respective encoded frame as another significant frame in case a cumulative difference exceeds a predefined threshold; and
    code instructions to output an indication for each of the plurality of significant frames to at least one analysis system adapted to analyze content of the significant frames;
  wherein the respective encoded frame is selected as the another significant frame in case a number of frames since the most recently selected significant frame exceeds a maximum frames threshold.

* * * * *